Patented Nov. 5, 1935

2,019,846

UNITED STATES PATENT OFFICE 2,019,846

DYESTUFF OF THE ANTHRAQUINONE SERIES

Joseph Deinet, Milwaukee, Wis., assignor to E. I. du Pont de Nemours & Company, Wilmington, Del., a corporation of Delaware No Drawing. Application January 25, 1935, Serial No. 3,471

6 Claims. (Cl. 260—57)

This invention relates to the preparation of new dyestuffs of the anthraquinone series. More particularly, the invention relates to dyestuffs produced by the fusion of 2-methyl-anthraquinone, 2-methyl-benzanthrone or their simple monovalent substitution products with sulfur monobromide.

It is known that when 2-methyl-anthraquinone or omega-halogen-2-methyl-anthraquinone is fused with sulfur, yellow dyestuffs are produced which may be converted to orange dyestuffs by further treatment in hot sulfuric acid. In this fusion, however, large quantities of undesirable impurities are formed. Even after purification the dyestuff produces relatively dull shades on cotton.

I have found that when 2-methyl-anthraquinone is fused with sulfur monobromide at temperatures above 230° C., dyestuffs are produced which are redder in shade and have greater tinctorial strength than those obtained when the fusion is carried out with sulfur alone, and that even without treatment with hot concentrated sulfuric acid, orange vat dyestuffs are produced which are materially brighter than those obtained according to the prior art.

The chemical structure of the products obtained by this process is not known with certainty. While they appear to be related to the dyestuffs obtained by the fusion of the same compounds with sulfur alone, comparative prints and dyeings show that they are materially different in shade and in strength, and it is therefore believed that the dyestuffs produced according to this invention are novel since they exhibit properties different from those which characterize the products of the prior art.

According to my invention, 2-methyl-anthraquinone may be fused with sulfur monobromide at temperatures between 160 and 210° C. to produce a yellow dyestuff which without further purification in the dry state is greenish-yellow in color, producing a yellow-brown vat with sodium hydrosulfite from which cotton is dyed in greenish-yellow shades, whereas the yellow dyestuff obtained according to the prior art by fusion with sulfur alone must be treated with bleach before it is at all suitable for use as a dyestuff. When the fushion is carried out at temperatures above 230° and preferably around 250° C., a dyestuff is produced which dyes cotton in orange shades, which has relatively high tinctorial power. It is desirable, however, to subject the resulting product to the action of bleach solution (for instance, sodium hypochlorite) to eliminate any impurities which may be formed in the process and thereby produce a color which dyes in exceptionally bright shades. When the color is to be used for printing, it is desirable to put it in a very fine form by the usual acid pasting or vatting procedures.

The fusion of the 2-methyl-anthraquinone or related products may be carried out in the presence or absence of a catalyst such as iodine, and preferably in the presence of an inert organic solvent which has a sufficiently high boiling point to permit the use of temperatures between 160 and 270° C. The solvent may, however, be omitted, in which case an excess of sulfur should be used as the diluent. The chloro- or amino-substituted 2-methyl-anthraquinones or 2-methyl-benzanthrones may be fused with sulfur monobromide in the same manner. In all cases the reaction proceeds in a smooth and uniform manner with the formation of materially lesser quantities of impurities than when the fusion is carried out in the absence of molecular quantities of bromine.

At least two moles of sulfur monobromide per mole of the anthraquinone compounds to be reacted upon should be used to carry the reaction to completion. The use of an excess of sulfur tends to stabilize the sulfur monobromide.

The following examples are given to more fully illustrate my invention. The parts used are by weight.

Example 1

50 parts of 2-methyl-anthraquinone, 300 parts of trichlorobenzene, 110 parts of sulfur monobromide and 0.5 parts of iodine are heated to 160° C. and held for 2 hours. The temperature is then raised to 205–210° C. and held at this point for 2 hours. The mass is cooled to 100° C. and filtered. The filter cake is washed with trichlorobenzene, followed with alcohol and dried.

The product thus obtained dyes cotton in greenish-yellow shades from a yellow-brown sodium hydrosulfite vat. By treating the product as above obtained with sodium hypochlorite solution, somewhat brighter dyeings and prints may be secured, although this treatment is not usually required. It dissolves in concentrated sulfuric acid with a brown color. Analysis of the product shows a sulfur content of 8.2% and a bromine content of 10.6%.

Example 2

100 parts of 2-methyl-anthraquinone are fused with 600 parts of phthalic anhydride at 150° C.

When solution is complete, 220 parts of sulfur monobromide are added and the temperature maintained at 150° for 1 hour. The mass is then slowly heated to 255-260° C. and maintained at this temperature for 5 hours. It is then cooled to 180° and drowned in 4000 parts of water. 320 parts of sodium hydroxide are added and the slurry heated to 100° C. and agitated at this temperature until the extraction of the phthalic acid appears to be complete. 200 parts of sodium sulfide solution (20%) are then added and the mass agitated for ½ hour. It is then filtered and the filter cake washed alkali free and dried. Trichlorobenzene may be used in place of sodium sulfide to extract the free sulfur contained in the mass.

The product may be acid pasted to put it in particularly fine form suitable for printing, and subsequently oxidized with sodium hypochlorite to remove the last traces of impurities that may be present. The product shows a red-violet color when dissolved in concentrated sulfuric acid and dyes cotton in bright orange shades from a red-brown sodium hydrosulfite vat. On analysis the product shows a sulfur content of 13.4% and a bromine content of less than 1.5%.

Example 3

100 parts of the product obtained in Example 1 are slurried in 900 parts of phthalic anhydride at 175-180° C. 100 parts of sulfur monobromide are added over a period of 1 hour at this temperature, and the temperature is then raised to 245-255° C. The mass is agitated at this temperature for 2 hours. The complete fusion mass is then drowned in 4000 parts of trichlorobenzene at 120° C. and filtered. The filter cake is washed with trichlorobenzene, followed with alcohol and dried.

The product is identical with that described in Example 2, and may be treated with bleach and acid pasted to render it suitable for printing.

Example 4

50 parts of 2-methyl-3-chloro-anthraquinone, 300 parts of trichlorobenzene, 12.5 parts of sulfur and 96 parts of sulfur monobromide are heated together at 160° C. for 2 hours. The temperature is then raised to 207° C. and maintained at this point for 6 hours. The mass is cooled to 100° and filtered. The filter cake is washed with trichlorobenzene, followed with alcohol and dried. The product is then subjected to the action of a bleach solution (sodium hypochlorite) to eliminate any impurities which may be present.

The resulting product dyes cotton in brownish-yellow shades from a yellow-brown sodium hydrosulfite vat.

Example 5

50 parts of 1-amino-2-methyl-anthraquinone, 300 parts of trichlorobenzene, 14 parts of sulfur and 105 parts of sulfur monobromide are heated together at 150° for 2 hours. The temperature is then raised to 207° and maintained for 6 hours. The mass is then cooled to 100° and filtered. The filter cake is washed with trichlorobenzene, followed with alcohol and dried.

The resulting product dyes cotton in brown shades with a blue cast from a brown hydrosulfite vat.

Example 6

35 parts of 2-methyl-6 (and 7-)-chloro-anthraquinone, 17.5 parts of sulfur and 65 parts of sulfur monobromide are added to 210 parts of trichlorobenzene and the mass heated under good agitation to 160° C. and held at this temperature for approximately 2 hours. The temperature is then raised to 203-210° C. and held for about 6 hours. The mass is then cooled to 30-35° C., filtered and the residual dyestuff washed with trichlorobenzene or other suitable solvent, followed by a wash with alcohol to remove the high boiling solvent that has been held in the residue.

The product thus obtained, after treatment with sodium hypochlorite solution, is an orange-yellow powder which dyes cotton reddish-yellow shades from a reddish-brown hydrosulfite vat.

Example 7

250 parts of sulfur and 50 parts of 2-methyl-anthraquinone are mixed together and 110 parts of sulfur monobromide are added and the mass slowly heated to 255-260° C. and maintained at this temperature for 1½-2 hours. The melt is poured into a flat receptacle and permitted to cool. After cooling it is pulverized and suspended in 2000 parts of sodium sulfide solution (18%), heated to 95-100° C. and held for 1 hour. The mass is filtered, washed free from alkali and dried. The product is then dissolved in 800 parts of sulfuric acid 100% and stirred for several hours at room temperature. The solution is then poured into 5000 parts of water, filtered, and the filter cake washed acid free. The resulting dyestuff is suspended in 500 parts of water, 750 parts of sodium hypochlorite (10-12% solution) are added and the mass heated to 65-70° C. and held at this temperature for several hours. The product is then filtered, and washed free of alkali. It dyes cotton from a reddish-brown sodium hydrosulfite vat in bright orange shades.

Example 8

50 parts of 2-methyl-benzanthrone, 300 parts of trichlorobenzene, 0.5 parts of iodine and 100 parts of sulfur monobromide are heated together to 100° and maintained at this temperature for 2 hours. The temperature is then raised to 207° C. and held at this temperature until no more hydrobromic acid is liberated. The mass is then cooled to 100° and filtered. The filter cake is washed with trichlorobenzene (at 100° C.), followed by alcohol, and dried. The resulting product is preferably dissolved in concentrated sulfuric acid at room temperature and precipitated by pouring the mass into a large volume of water, letting the temperature rise to 65-70° C. The product thus obtained, after separation from the sulfuric acid solution, dyes cotton in greenish-blue shades from a reddish-blue sodium hydrosulfite vat, and exhibits a violet color when dissolved in sulfuric acid.

By the use of sulfur monobromide the reaction proceeds in a smooth and uniform manner, and the resulting products are invariably brighter in shade and exhibit greater tinctorial strength than those obtained when the fusion is carried out in the absence of stoichiometrical amounts of bromine. In the examples above given, the sulfur monobromide is preferably formed in the reaction by dissolving molecular quantities of sulfur and bromine, using if desired an excess of sulfur as above pointed out.

I claim:

1. The process which comprises fusing a 2-methyl-anthraquinone compound with sulfur monobromide at temperatures above 150° C.

2. The process which comprises fusing a 2-methyl-anthraquinone compound with sulfur monobromide at temperatures above 230° C.

3. A process for producing orange dyestuffs which comprises fusing 2-methyl-anthraquinone with sulfur monobromide in an inert high boiling solvent at temperatures above 230° C.

4. Dyestuffs obtainable by the process outlined in claim 1.

5. Dyestuffs obtainable by the process outlined in claim 2.

6. Dyestuffs obtainable by the process outlined in claim 3.

JOSEPH DEINET.